Figure 1:
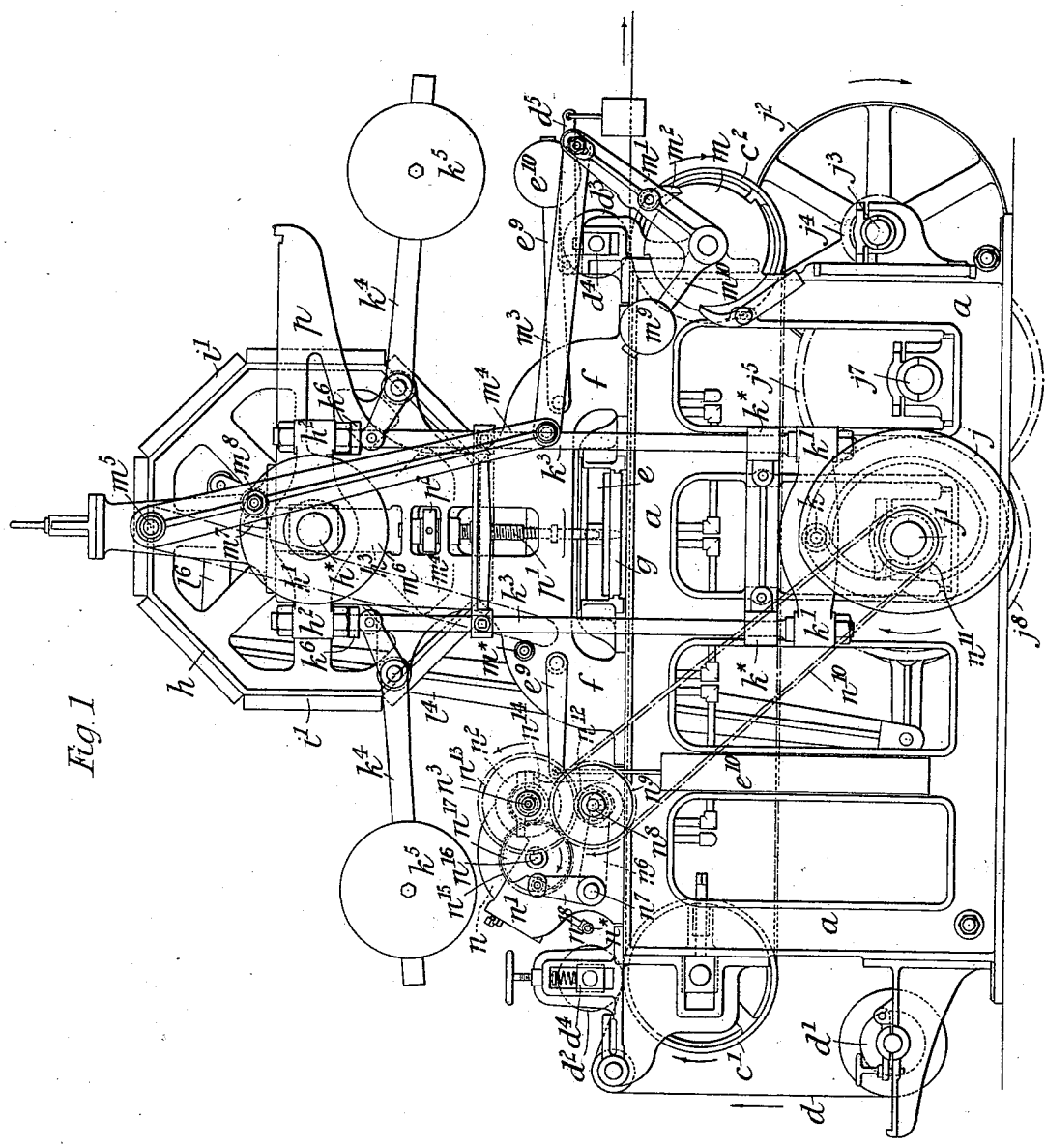

(No Model.)
9 Sheets—Sheet 1.

W. J. BEARD.
MACHINE FOR THE MANUFACTURE OF FLOOR CLOTH.

No. 508,463. Patented Nov. 14, 1893.

Witnesses
G. F. Redfern
John E. Bousfield.

Inventor.
W. J. Beard.

(No Model.)  9 Sheets—Sheet 4.

W. J. BEARD.
MACHINE FOR THE MANUFACTURE OF FLOOR CLOTH.

No. 508,463.  Patented Nov. 14, 1893.

Witnesses.
G. H. Redfern
John E. Dousfield

Inventor.
W. J. Beard (No Model.)  
9 Sheets—Sheet 5.

W. J. BEARD.
MACHINE FOR THE MANUFACTURE OF FLOOR CLOTH.

No. 508,463.  
Patented Nov. 14, 1893.

Witnesses  
G. Redfern  
John E. Bousfield

Inventor  
W. J. Beard (No Model.) 9 Sheets—Sheet 6.
W. J. BEARD.
MACHINE FOR THE MANUFACTURE OF FLOOR CLOTH.
No. 508,463. Patented Nov. 14, 1893.
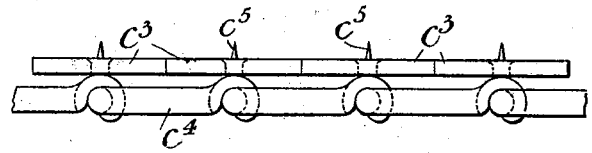
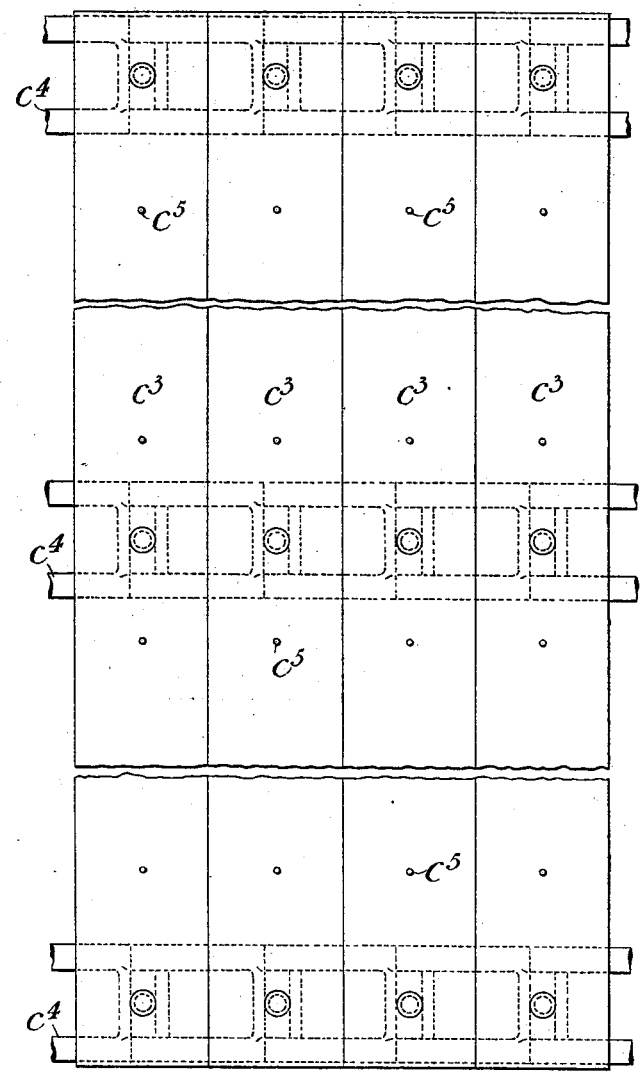
Witnesses
Inventor (No Model.)  9 Sheets—Sheet 7.

W. J. BEARD.
MACHINE FOR THE MANUFACTURE OF FLOOR CLOTH.

No. 508,463. Patented Nov. 14, 1893.

Witnesses

Inventor
W. J. Beard.

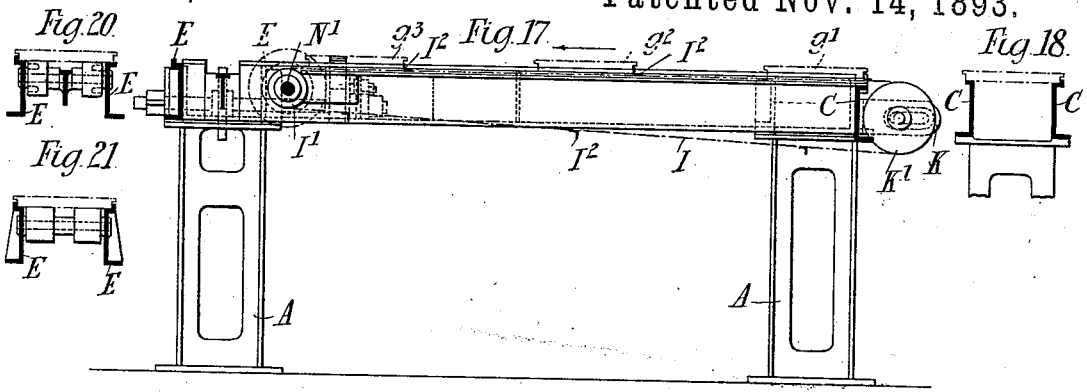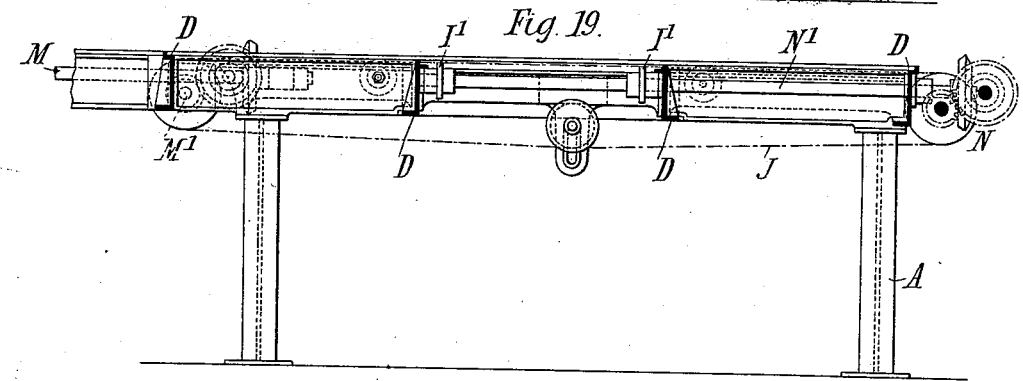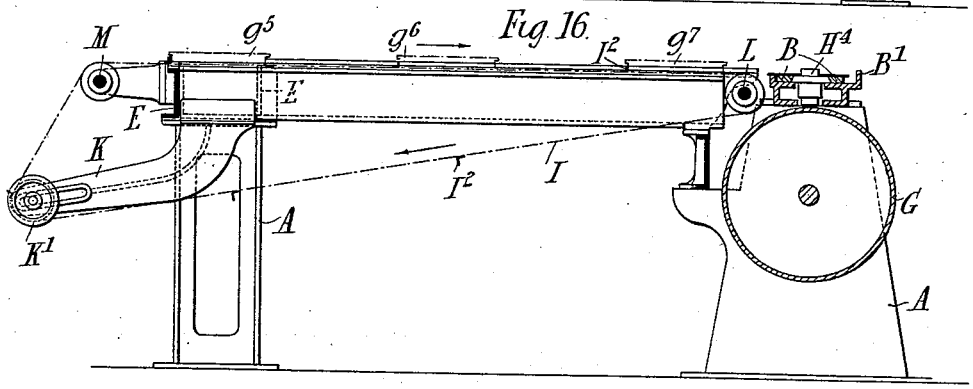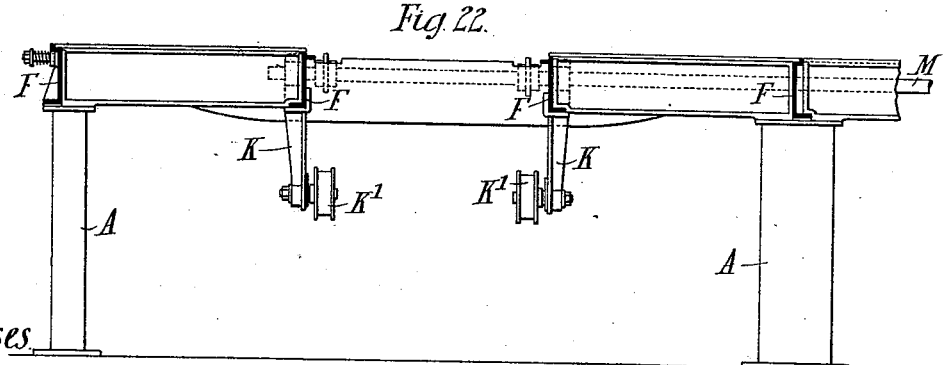

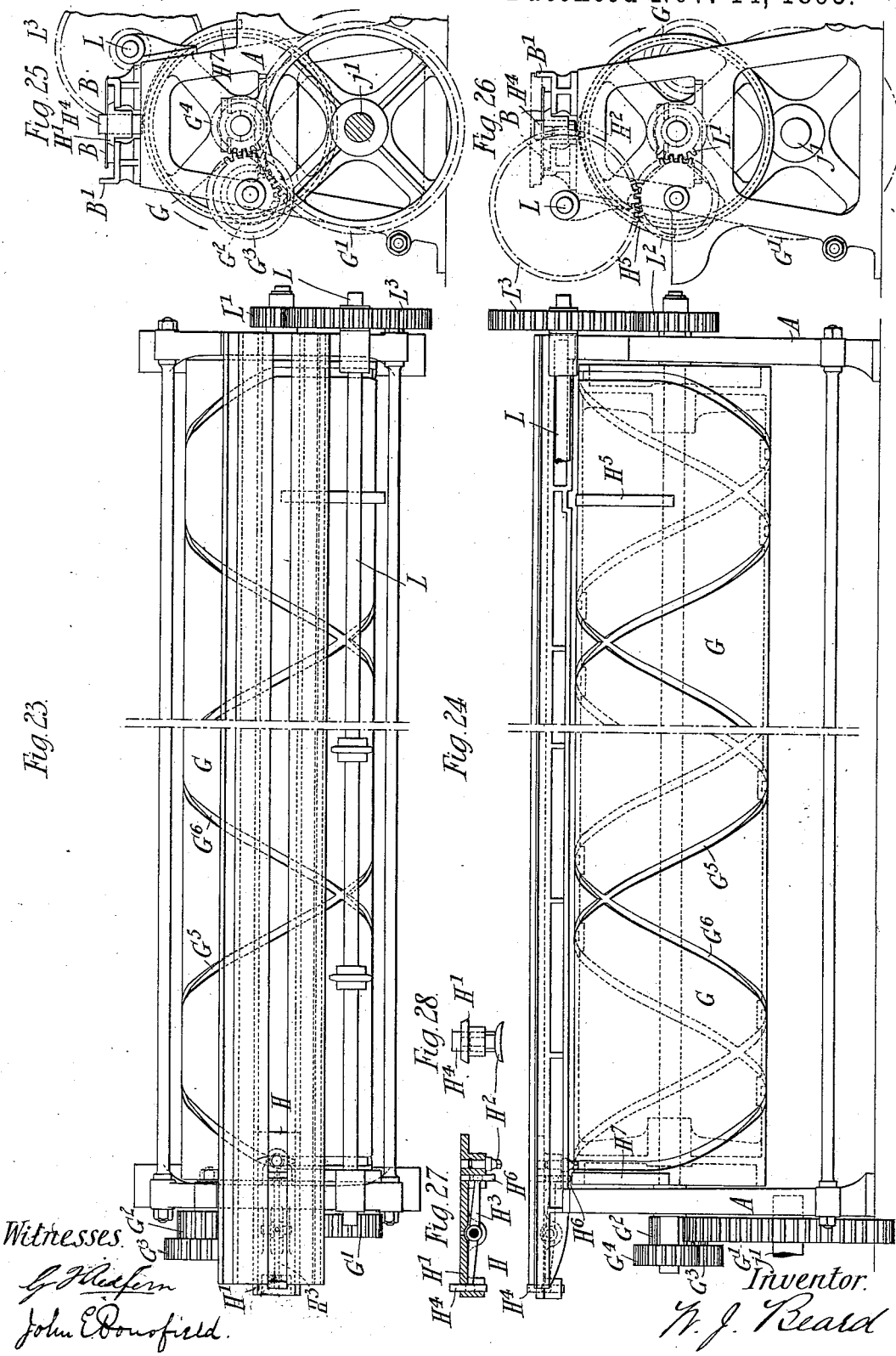

UNITED STATES PATENT OFFICE.

WILLIAM JOHN BEARD, OF PONDERS END, ASSIGNOR TO THE CORTICINE FLOOR COVERING COMPANY, LIMITED, OF LONDON, ENGLAND.

MACHINE FOR THE MANUFACTURE OF FLOOR-CLOTH.

SPECIFICATION forming part of Letters Patent No. 508,463, dated November 14, 1893.

Application filed August 17, 1892. Serial No. 443,352. (No model.)

*To all whom it may concern:*

Be it known that I, WILLIAM JOHN BEARD, a subject of the Queen of Great Britain, residing at Ponders End, England, have invented new and useful Improvements in Machines for the Manufacture of Floor-Cloth, of which the following is a specification.

This invention relates chiefly to improvements in the manufacture of that kind of floor cloth known as linoleum and of like fabrics in which the colors of the design are continuous through the substance of the material.

The said invention has for its object to provide an improved machine for cutting out and applying the different pieces of material necessary to make up the pattern and it consists chiefly in the novel arrangement of punches or dies and die or pattern plates for cutting out the pieces of the required shape to make up a pattern and in the novel means for operating the punches or dies.

In carrying out the invention a suitable table is provided over which the canvas backing, upon which the linoleum is to be laid, is caused to travel intermittently a distance corresponding to the total length of the pattern to be produced, and in a frame stretched across the table at a suitable distance above the same a number of punches or dies is arranged corresponding to the number of pieces in the pattern, the said punches or dies fitting closely one against the other so that the guides for each of the said punches or dies are formed by the punches or dies adjacent to it. In the said frame carrying the punches or dies are formed guides into which a series of die or pattern plates (each of which has openings corresponding to the different parts of the pattern of one color and through which the punches or dies for cutting out the pieces of material of this color are designed to pass) are successively introduced and withdrawn, as many die or pattern plates being used in the series as there are different colors in the pattern to be produced.

In sliding bearings above the frame carrying the punches is arranged a press head in the form of a roller or drum of polygonal shape, and having at least as many sides or faces as there are colors in the design, and upon each of these faces pins are arranged designed when the press head is lowered to operate the punches or dies corresponding to the openings in the die or pattern plate beneath it.
It is sometimes found advantageous to arrange in conjunction with the improved apparatus means for automatically introducing and removing the die or pattern plates successively.
To enable the invention to be fully understood it is described by reference to the accompanying drawings, in which—

Figure 2:
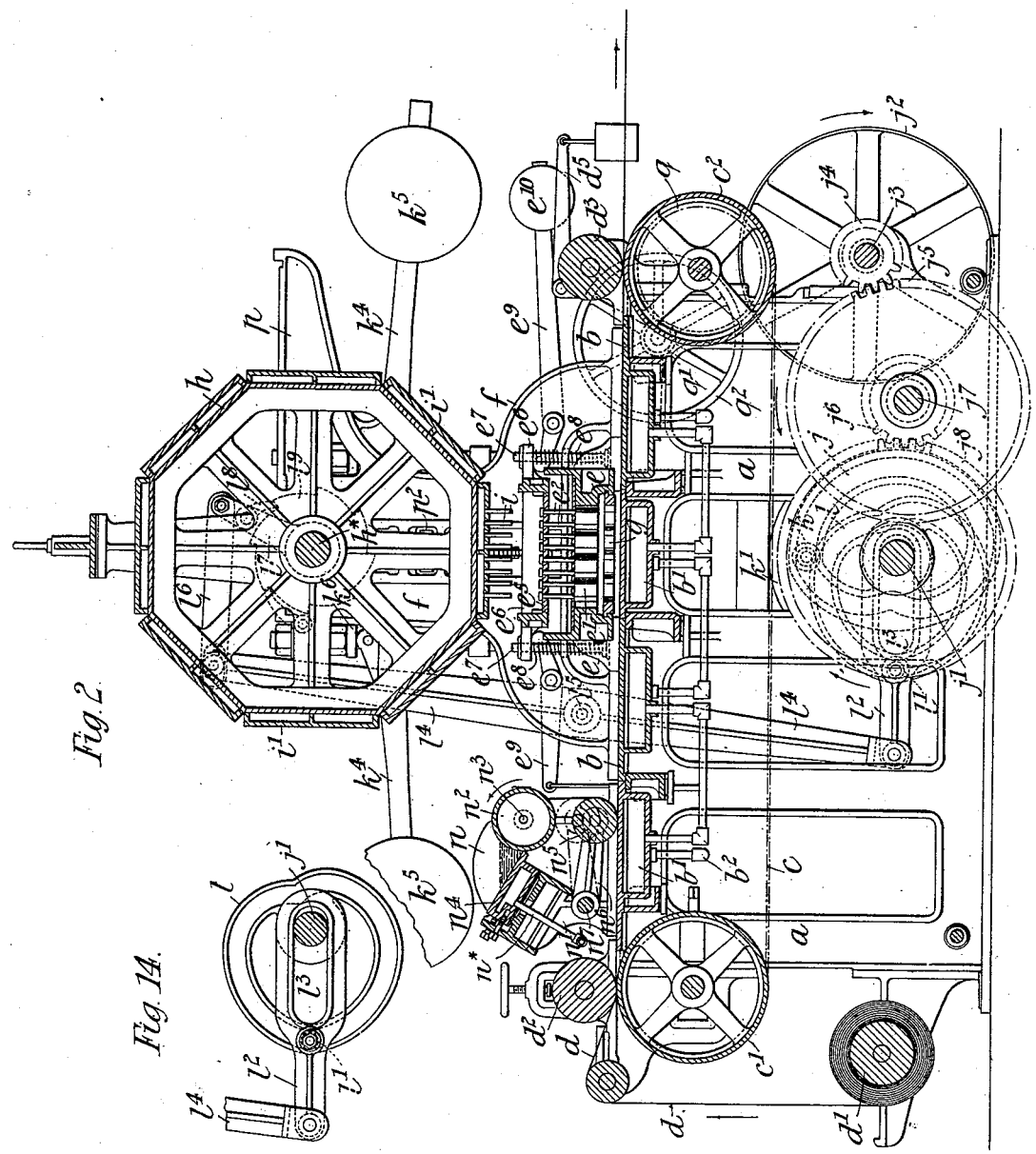
Figure 3:
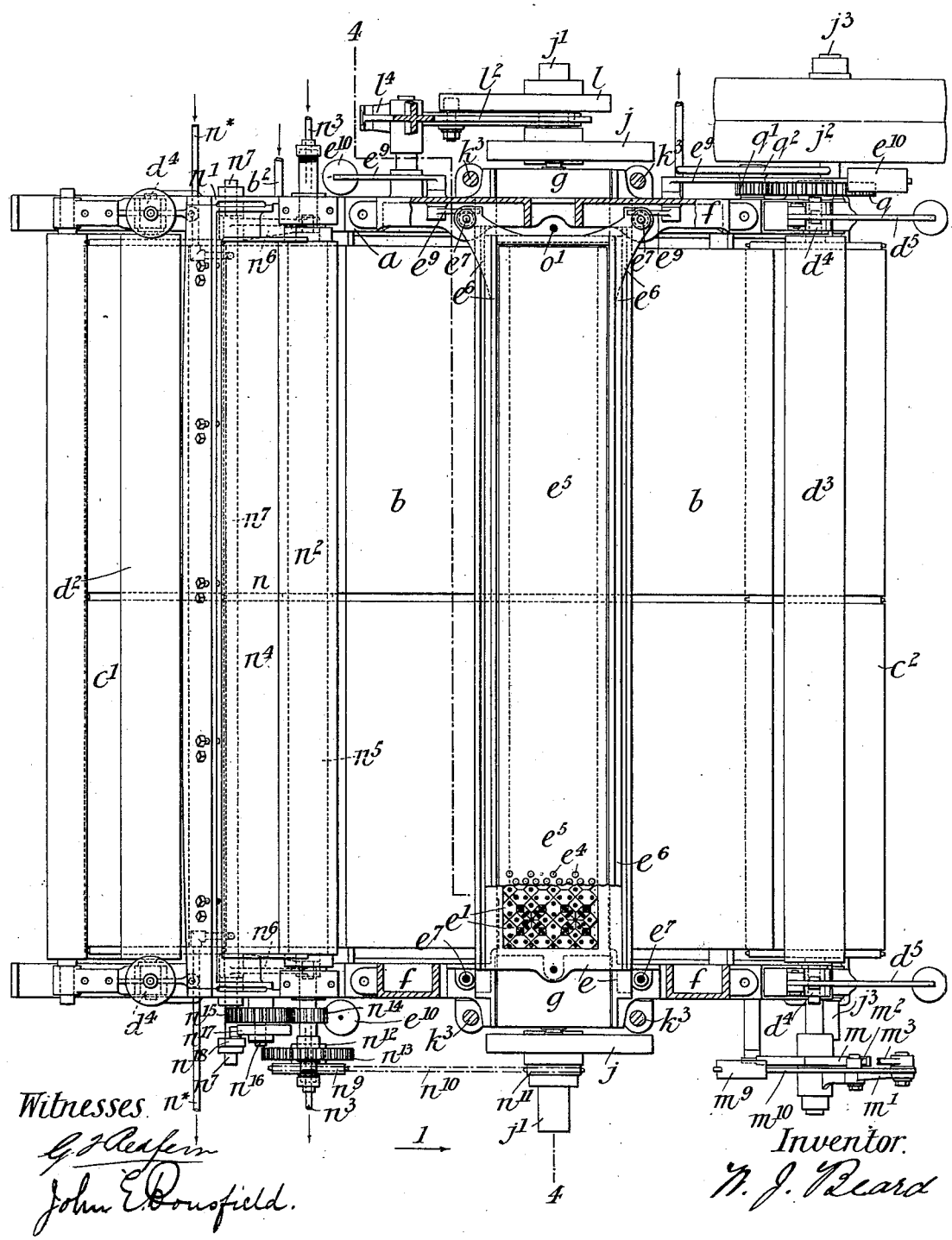
Figure 4:
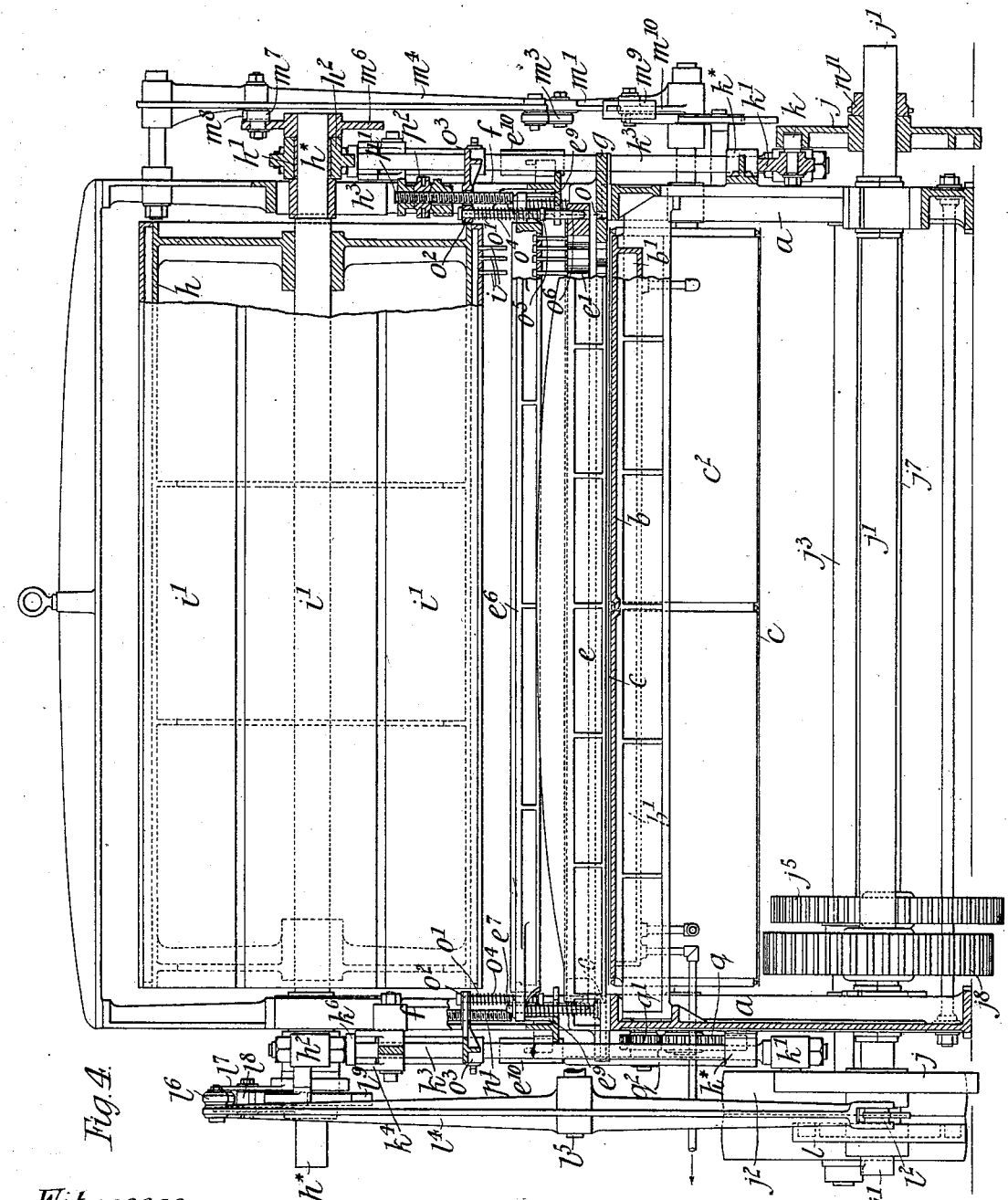
Figure 5:
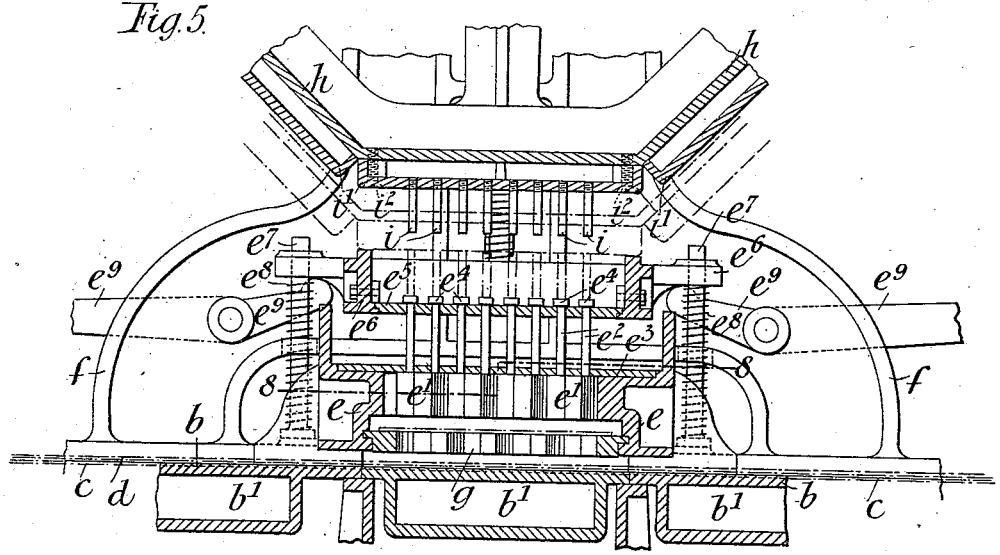
Figures 15, 31:
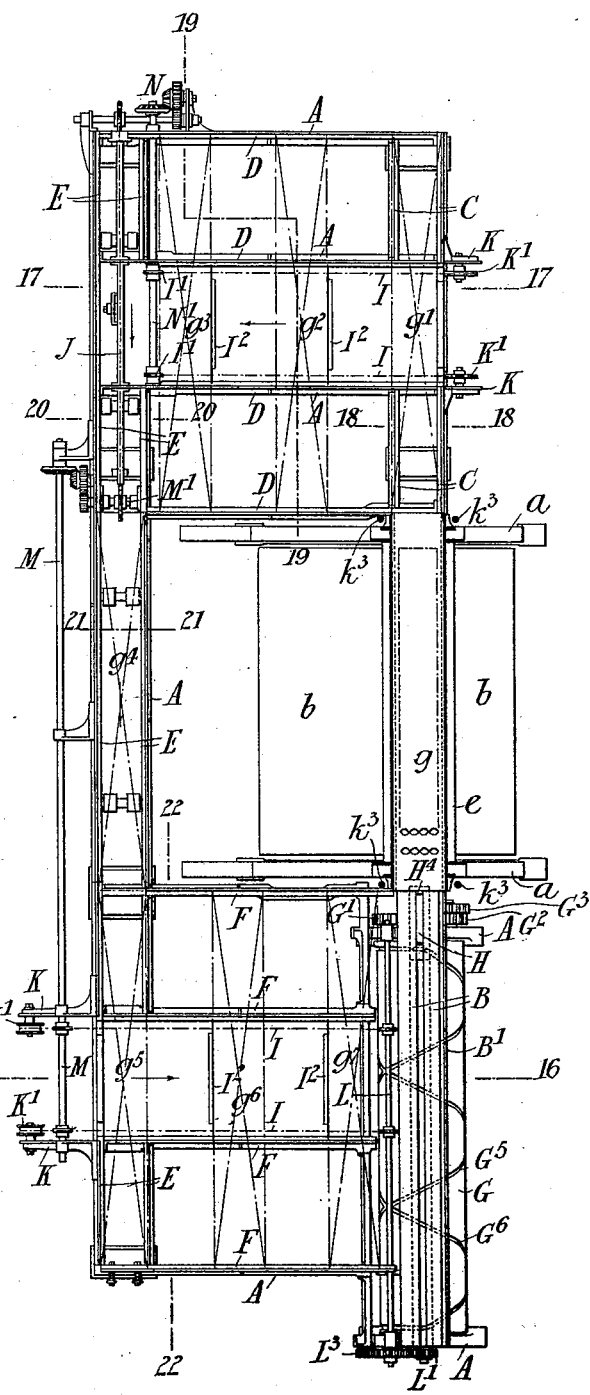

Figure 1 is a side elevation of a machine embodying the improvements. Fig. 2 is a longitudinal section of the same. Fig. 3 is a sectional plan, certain parts being removed. Fig. 4 is a section on the line 4 4 of Fig. 3 looking in the direction of the arrow 1. Fig. 5 is a view of a portion of Fig. 2 drawn to a larger scale. Figs. 6 to 14 are views hereinafter described. Fig. 15 is a plan view showing the arrangement of mechanism which is sometimes employed for successively introducing and removing the die or pattern plates. Figs. 16 to 31 are views of details of the feed mechanism hereinafter described.

Similar letters and figures of reference indicate corresponding parts in the several figures.
$a$ is the frame and $b$ is the table which is formed in sections, each of which sections is provided with a chamber $b'$ through which steam introduced through a pipe $b^2$ may be caused to circulate in order to heat the said table.

$c$ is a traveling platform carried upon rollers $c'$, $c^2$ and designed to feed forward a canvas backing $d$ to which the pieces of material making up a pattern are applied, the said canvas backing being unwound from a roller $d'$ on the lower part of the frame of the machine.

$d^2$, $d^3$ are two rollers mounted in sliding bearings $d^4$, $d^4$ and serving to maintain the canvas backing $d$ in close contact with the traveling platform $c$. The pressure of the roller $d^2$ is adjusted by means of hand wheels through the medium of springs and screws, while the roller $d^3$ is acted upon by weighted levers $d^5$. The roller $d^3$ also serves to press the pieces of material laid as hereinafter described upon the canvas $d$ into close contact therewith.

The traveling platform $c$ is preferably constructed in the manner illustrated by Figs. 6 and 7 which are respectively a side elevation and a plan of a portion of the said platform. As shown in these figures the platform consists of a series of transverse strips $c^3$, $c^3$ connected to three sprocket chains $c^4$, $c^4$, $c^4$ and in order to cause the canvas $d$ to move with the traveling platform the latter is provided with a series of pins $c^5$, $c^5$ upon its surface, which pins engage with the canvas and draw it forward as the traveling platform is moved.

Figure 8:
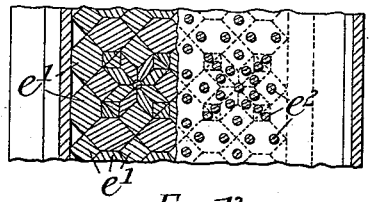
Figure 9:
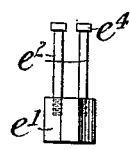
Figure 10:

$e$ is the frame which extends across the table at a sufficient distance above the same to allow the canvas backing with the pieces of material laid thereon to pass between it and the table, and $e'$, $e'$ are the dies or punches which slide one against the other as shown in Fig. 8 (which is a section on the line 8 8 Fig. 5) and one of which is shown in elevation and plan in Figs. 9 and 10. The dies or punches shown in Fig. 8 are constructed for producing a pattern of the kind shown in Fig. 11 and containing eight colors, the different parts of the same color being indicated by the same numeral, that is to say, all the parts of one color are numbered 1 of another color 2, of another color 3 and so on.

Each of the dies or punches is provided at its upper end with one or two pins $e^2$ according to its size, which pins slide in a guide-plate $e^3$ extending across the frame as shown most clearly in Fig. 5 and each of which pins has at its upper end a head $e^4$ which rests upon another plate $e^5$ carried in a frame $e^6$ sliding at its four corners upon guide pins $e^7$ and supported by springs $e^8$, $e^8$ and balance levers $e^9$ carrying weights $e^{10}$, $e^{10}$, the said levers $e^9$, $e^9$ being pivoted upon two standards $f$, $f$, mounted upon the sides of the frame $a$.

Figure 12:
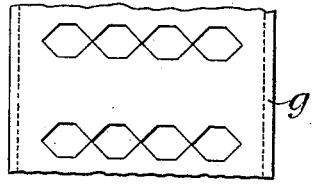
Figure 11:
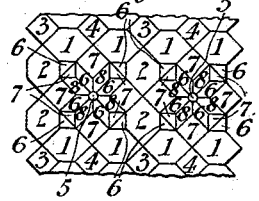

$g$ is one of the die or pattern plates which is carried in guides in the frame $e$ and adapted to be introduced and removed at the side of the machine. As hereinbefore stated one of these die plates is provided for each color in the pattern so that for producing a pattern of the kind shown in Fig. 11 eight of such die plates would be employed. Fig. 12 shows a portion of one of the die plates which is provided with openings corresponding to the parts 1 1 of the pattern, another plate being provided for the parts 2 2, another for the parts 3 3 and so on, each plate only having therein holes for allowing the passage of the dies or punches for stamping out one color.

$h$ is the press head which, as shown in the drawings, is a roller or drum of octagonal shape, the number of the sides corresponding to the number of the colors in the pattern. The said press-head has its shaft $h^\times$ carried in bearings $h'$, $h'$ in cross-heads $h^2$, $h^2$ and in bearings guided in slots $h^3$, $h^3$ formed in the standards $f$, $f$. Upon each face of this press-head are fixed pins $i$, $i$, the pins on each face being designed when the press-head is lowered to impinge against the pins $e^2$, $e^2$ of the punches to be depressed. As shown in Fig. 5, and in Fig. 13 which is an under side view of a portion of the lowermost face of the press-head shown in Fig. 5, the pins $i$, $i$ are arranged for impinging against those pins $e^2$, $e^2$ connected to the dies or punches for cutting out the parts 1, 1 of the pattern.

Figure 13:
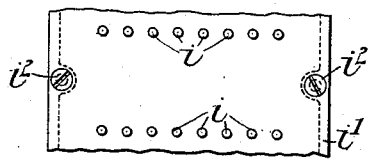

In practice the pins $i$, $i$ are not directly secured to the surface of the drum or roller but are attached to plates $i'$, $i'$ designed to be secured to the surface of the drum for instance by screws $i^2$, $i^2$, Figs. 5 and 13.

When the press-head is lowered to operate certain of the punches the plate $i'$ comes into contact with the upper edge of the frame $e^6$ at the same time that the pins $i$, $i$ impinge against the pins $e^2$, $e^2$ (as indicated by the dotted lines in Fig. 5) so that during the continued downward movement of the press-head the frame $e^6$ will be pressed downward against the pressure of the springs $e^8$, $e^8$ and the weights on the levers $e^9$, $e^9$ until all the punches rest upon the material to be cut; the continued downward movement of the press-head then causes those punches upon the pins $e^2$ on which pins $i$, $i$ press, to move still farther downward in order to force out the pieces of material through the holes in the pattern plate $g$ onto the canvas beneath the said pattern plate.

Motion is imparted to the press-head in order to raise and lower the same by two cams $j$, $j$ mounted on a shaft $j'$ driven from the belt pulley $j^2$ upon the driving shaft $j^3$ through the medium of the pinion $j^4$ upon the shaft $j^3$, the spur-wheels $j^5$ and the pinion $j^6$ upon a counter-shaft $j^7$, and a gear-wheel $j^8$ engaging with the pinion $j^6$ and secured to the shaft $j'$. The said cams $j$, $j$ engage with rollers $k$, $k$ upon two cross-heads $k'$, $k'$ connected with the cross-heads $h^2$, $h^2$ carrying the press-head bearings, by rods $k^3$, $k^3$, in such a manner that when the cross-heads $k'$ are raised by the cams the cross-head $h^2$ and also the press-head carried thereby will be raised. The rods $k^3$, $k^3$ work in guides $k^\times$. It will be noticed that the grooves in the cams $j'$, $j'$ are for about half their length concentric with the shaft $j'$ so that during a similar proportion of the rotation of the said cams the press-head $h$ will remain in its highest position thereby allowing time for the introduction and removal of the different die or pattern plates.

$k^4$, $k^4$ are levers carrying weights $k^5$, $k^5$ and acting against collars $k^6$, $k^6$ upon the rods $k^3$, $k^3$, the said levers with their weights serving to balance the press-head.

Intermittent rotary motion is imparted to the press-head in order to bring the several faces thereof successively over the dies by means of a cam $l$ also mounted on the shaft $j'$. This cam which is shown detached in Fig. 14 (which is an elevation of the said cam $l$ and of some of the parts in immediate connection with it) has running in its groove a roller $l'$ carried upon a link $l^2$ one end of which is slotted at $l^3$ to slide upon the shaft $j'$, which serves as a guide, while the other end is connected to one end of a lever $l^4$ pivoted at $l^5$ upon one of the side standards $f$, the other end of the said lever being connected by a link $l^6$ to a lever $l^7$ loosely mounted upon the shaft $h^\times$ of the press-head and carrying a pawl $l^8$ engaging with a ratchet wheel $l^9$ fixed to the said shaft $h^\times$. From this description it will be understood that each time the shaft $j'$ rotates, the press-head will be rotated the distance of a tooth.

The cam $l$ is fixed upon the shaft $j'$ in such relation to the cams $j, j$ that it operates to rotate the said press-head during the time that the concentric portions of the grooves of the cams $j, j$ are acting upon the rollers $k$, that is to say, during the time that the press-head is in its uppermost position.

The operation of the apparatus as thus far described is as follows:—The press-head being in its uppermost position a die or pattern plate $g$ containing openings corresponding to say the parts 1, 1 of the pattern is placed in the frame $e$ with a sheet of the linoleum in the required condition and of the required color lying thereon, as indicated by the dotted line in Fig. 5. The machine being then set in motion the press-head descends and the punches corresponding to the openings in the plate $g$ are pressed downward so that pieces of material are cut from the linoleum and deposited upon the canvas which is beneath it. This having taken place and the press-head having again moved to its uppermost position, the plate $g$ first introduced is withdrawn and a second pattern plate having openings corresponding, say, to the parts 2 of the pattern is introduced with a sheet of linoleum of the desired color upon the same. When now the press-head (which during the withdrawal of one plate and the introduction of another has been rotated to the required extent by the means hereinbefore described again descends, the pieces of linoleum corresponding to the parts 2, 2 of the pattern are pressed out and deposited upon the canvas backing beside the parts 1, 1 and this operation is continued until the pattern is completed, it being understood, as hereinbefore stated, that a separate die or pattern plate is introduced and the punches or dies corresponding with the openings therein operated for each color. The portion of the canvas beneath the plungers being covered, the canvas is moved forward a distance corresponding to the length of the pattern and as the fabric comes from the machine it passes under a powerful press, the base and head of which are heated if found necessary for the purpose of pressing the material into the canvas backing and for consolidating the pieces and also to form an even surface on the face of the fabric.

In order to effect the forward movement of the platform $c$ carrying the canvas the following mechanism is provided, that is to say, upon the shaft of the carrying roller $c^2$ of the platform is fixed a ratchet wheel $m$, as shown clearly in Fig. 1, and upon the said shaft is loosely mounted a lever $m'$ carrying a pawl $m^2$ adapted to engage with the teeth of the said ratchet wheel $m$. The free end of this lever $m'$ is connected by a link $m^3$ to the lower end of a swinging lever $m^4$, the upper end of which is pivoted at $m^5$ to one of the standards $f$. Upon the shaft $h^\times$ of the press-head a disk $m^6$ is fixed having on it a lug or projection $m^7$ designed to engage with a roller or tappet $m^8$ upon the lever $m^4$. This disk $m^6$ is so arranged that, after the press-head has risen after operating in connection with the last of the series of die plates necessary to complete the pattern and while the said press-head is being rotated in order to bring the next surface thereof into position for commencing the next pattern its lug or projection $m^7$ will come into contact with the roller $m^8$ and move the same and with it the lever $m^4$ from the position indicated in the dotted lines in Fig. 1 to the position shown in full lines in the said figure thereby operating the lever $m'$ carrying the pawl in such a manner as to move the ratchet wheel $m$ forward the required distance. Immediately the press-head is next lowered to operate in connection with the first of the series of die plates, the said lug or projection $m^7$ being connected to the shaft of the press-head, is moved downward out of contact with the roller $m^8$ so that the lever $m^4$ can swing backward to the position indicated by the dotted lines under the action of a weight $m^9$ carried upon an arm $m^{10}$ projecting from the lever $m'$, so that its pawl will move back over a tooth of the ratchet-wheel ready to engage with the tooth to rotate the said wheel by the time that the press-head has made another revolution so as to bring the lug or projection $m^7$ into contact with the roller $m^8$. $m^\times$ is a stop for limiting the movement of the lever $m^4$ in one direction.

In order that, as the separate pieces of material for making up the pattern are deposited upon the canvas they shall be fixed thereto, provision is made for applying a suitable adhesive cement to the surface of the canvas as the same is fed forward beneath the dies or punches. Mechanism suitable for this purpose and which somewhat resembles the inking apparatus used in a printing machine is shown in Figs. 1 and 2 where $n$ indicates a trough for the adhesive material, which trough is carried between suitable brackets $n', n'$ upon the sides of the frame $a$. The front of this trough is composed of a roller $n^2$ which is made hollow so that steam for heating the same may be introduced through a pipe $n^3$ and the back or bottom $n^4$ of the trough is made adjustable relatively to the roller in order that the space between the edge thereof and of the roller $n^2$ may be adjusted according to the quantity of adhesive material to be delivered. This bottom $n^4$ is made hollow and has pipes $n^\times$ connected thereto for the introduction and escape of steam for heating the same if this is necessary.

$n^5$ is a distributing roller which is carried by arms $n^6$, $n^6$ secured to a shaft $n^7$ and adapted to be alternately placed in connection with the roller $n^2$ as indicated by the dotted lines in Fig. 2 and with the canvas as indicated by the full lines in the said figure. This movement of the distributing roller and also the rotation of the roller $n^3$ is effected by the following means, that is to say, upon a stud $n^8$ upon one of the side frames $n'$ is a sprocket wheel $n^9$ driven by a sprocket chain $n^{10}$ from a sprocket wheel $n^{11}$ upon the shaft $j'$. Attached to or formed integral with the sprocket wheel $n^9$ is a pinion $n^{12}$ which engages with a gear-wheel $n^{13}$ upon the shaft of the roller $n^2$ so that motion is imparted to the said roller. Upon the same shaft is fixed a pinion $n^{14}$ engaging with a gear-wheel $n^{15}$ carried upon another stud $n^{16}$; also upon one of the side frames $n'$ attached to or formed integral with the wheel $n^{15}$ is a cam $n^{17}$ (Figs. 1 and 3). Upon the shaft $n^7$ is fixed an arm $n^{18}$ carrying a roller against which the cam $n^{17}$ can operate. The cam $n^{17}$ is so constructed that as it is rotated it will act upon the roller of the lever $n^{18}$ and oscillate the same together with the shaft $n^7$, the levers $n^6$, $n^6$ and the distributing roller $n^5$.

To insure that the die or pattern plates $g$, $g$ shall be properly adjusted so that the openings therein exactly coincide with their respective dies, there are formed in the said pattern plates $g$, $g$ the conical holes $o$, $o$ into which pins $o'$, $o'$ having conical points are designed to enter in such a manner that if the said conical holes do not exactly coincide with the pins the said pins will move the plate beneath the dies to the required extent. These pins $o'$, $o'$ at their upper ends are carried by projections $o^2$, $o^2$ upon cross bars $o^3$, $o^3$ firmly attached to the bars $k^3$, $k^3$ for raising the press-head. As, however, the vertical movement which the bar $o^3$ receives is greater than that which it is necessary to impart to the pins $o'$, $o'$, the latter are not rigidly connected to the said bars $o^3$, $o^3$ but have springs $o^4$, $o^4$ arranged between collars $o^5$, $o^5$ upon the bar and the under sides of the projecting portions $o^2$, $o^2$. These springs with the pins $o'$, $o'$ having been moved down to the required position allow the said pins to remain stationary while the downward movement of the cross-bars $o^3$, $o^3$ continues. The lower ends of the pins $o'$, $o'$ work in guides $o^6$, $o^6$ upon the frame $e$.

In changing the punches for producing different patterns it is necessary to remove the press-head from over the punch or die carrying frame. On the standards $f, f$ therefore arms $p, p$ are provided onto which the said press-head may be lifted and on which the press-head may be supported during the time that the punches are being changed, and in order to lift the said press-head to such a position that it may be pushed onto these arms $p, p$ lifting screws $p'$, $p'$ are provided in the side standards $f, f$. These lifting screws are arranged as shown in Figs. 1 and 4 so that they can be moved up and down freely in openings in the said side standards by nuts $p^2$. $p^2$. but are held against rotation by feather keys; that is to say, the nuts $p^2$. $p^2$. are held against longitudinal movement in such a manner that when the said nuts are rotated the screws will be raised or lowered. As shown in the drawings these screws are not of sufficient height to raise the press-head to the required extent. Blocks are therefore provided which may be introduced between the bearings of the press-head sliding in the slots $h^3$, $h^3$ and the heads of the screws $p'$, $p'$ before the latter are raised by means of the nuts.

In order that the platform $c$ may be moved independently of its driving mechanism suitable gearing is provided for the purpose, the said gearing as shown comprising a gear-wheel $q$ fixed to the shaft of the roller $c^2$ and a pinion $q'$ gearing with the said wheel operated by a hand-wheel $q^2$.

As hereinbefore stated means are sometimes provided for mechanically introducing the die or pattern plates beneath the press-head and punches and removing them therefrom. Such means comprises a framework carrying a series of guides so arranged that the die or pattern plates can be moved thereon through a circuit, that is to say, the said guides are so arranged that each die or pattern plate can be first pushed beneath the punches from one side of the machine then pushed from beneath the punches through the other side of the machine, then moved transversely onto a guide upon which it is pushed back to the side of the machine at which it is introduced and then transversely in an opposite direction to the transverse motion previously referred to into line with the said guides beneath the punches and so on.

In practice all the pattern plates of the series used in the production of a pattern are at different parts of the guides and during the time that the said die or pattern plates are passing around the circuit the pieces of punched material lying thereon are removed and fresh pieces of material of the required colors are applied. Preferably the die or pattern plates are introduced beneath the plungers by means of a drum having reverse screw-threads or spiral grooves engaging with a pusher in such a manner that when the pusher has been pushed forward by the thread in one direction it will be returned to its original position by the thread in the reverse direction and the pattern plate carrying the piece of material which is to be next punched is arranged to push out the pattern plate carrying the material which has been previously operated upon. The other transverse and longitudinal movements of the plates are effected by means of sprocket chains carrying bars designed to engage with the plates at suitable intervals.

In Figs. 15 to 31 which illustrate this part of the invention A is a metal frame having guides B, B from which the pattern plates are introduced beneath the plungers, the guides C, C on to which the said pattern plates run as they are pushed from beneath the plungers; the transverse guides D, D upon which the plates pushed out of the machine are moved transversely; the longitudinal guides E, E upon which the plates are moved back again to that side of the machine at which they are introduced, and the transverse guides F, F upon which the plates are moved from the longitudinal guides E, E back to the guides B, B from which they are again introduced into the machine. The guides B, B consist of two plates and of a guide flange B', the said guides being shown most clearly in Fig. 16 which is a section on the line 16 16 Fig. 15. The guides C, C are composed of plates of the shape shown in Figs. 17 and 18 which are sections on the lines 17, 17 and 18, 18 respectively of Fig. 15. The transverse guides D, D are arranged as shown in Fig. 19 which is a section on the line 19, 19 Fig. 15. The longitudinal guides E, E are similar to the guides C, C as shown at the left hand end of Fig. 17 and in Figs. 20 and 21 which are respectively sections on the lines 20, 20 and 21, 21, Fig. 15. The guides F, F and their arrangement will be understood by reference to Fig. 22, which is a section on the line 22, 22, Fig. 15. Figs. 16 to 22 are drawn to a larger scale than Fig. 15.

G is the drum having the spiral grooves, which drum is mounted in suitable bearings in the brackets of the frame A immediately beneath the guides B, B, the said drum being rotated by means of a gear-wheel G' on the shaft $j'$ hereinbefore described, engaging with a pinion $G^2$ having formed integral with it a wheel $G^3$ engaging with a pinion $G^4$ upon the axle of the reversed screw. This spirally grooved drum and its connected mechanism are shown drawn to an enlarged scale in Figs. 23 to 26, Fig. 23 being a plan of the said screw and the connected parts, Fig. 24 an elevation, Fig. 25 a left hand end view and Fig. 26 a right hand end view.

$G^5$ is the right hand groove or thread of the drum and $G^6$ is the left hand or reversed thread thereof and H is the pusher or slide which is operated by the said groove or thread. This pusher which is shown in longitudinal section in Fig. 27 and in end elevation in Fig. 28 comprises a sliding plate H' having pivoted to it and projecting beneath its under side a traveler $H^2$ adapted to work in the groove of the drum G. The said sliding plate has also on its under side a pivoted lever $H^3$, one end of which carries a bar $H^4$ adapted to be projected above the surface of the slide H, in order to engage with the pattern plate to be pushed forward by means of a cam-surface $H^5$ on the surface of the drum G, which cam-surface at a certain part of the rotation of the said drum is designed to act against the lower end of the said bar $H^4$. The other end of the lever $H^3$ carries a tappet $H^6$ against which another cam-surface $H^7$ on the drum G is designed to act in order to operate the said lever $H^3$ to withdraw the bar $H^4$ beneath the surface of the guides B, B during the time that the said slide H is being moved backward.

It will be noticed that the ends of the thread or groove in the drum have no inclination, and the object of thus constructing the ends of the groove is that no longitudinal movement shall be imparted to the slide H during the time that either of the cam-surfaces $H^5$ or $H^7$ is acting upon the lever $H^3$.

Figure 29:
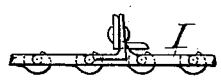
Figure 30:
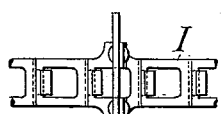

The operation of this part of the feeding apparatus is as follows: Assume the slide H and the projecting bar $H^4$ to be in the position shown in Figs. 23 and 24 which is the position they occupy immediately after a pattern plate has been pushed into the machine beneath the punches, and the traveler $H^2$ in the straight portion of the groove of the drum G. As now the drum rotates no longitudinal movement will for a short period be imparted to the slide H but during this time the cam-surface $H^7$ will act upon the tappet $H^6$ to move the lever $H^3$ to withdraw the bar $H^4$ below the surface of the slide. Immediately this is accomplished the right hand groove $G^5$ of the drum moves the slide to the right hand end of the said drum, having reference to Figs. 23 and 24. Immediately that the traveler $H^2$ enters the straight portion of the groove at the said right hand end, the cam $H^5$ acts upon the lower end of the bar $H^4$ to project the same above the surface of the guide for pushing another pattern plate forward. As hereinbefore stated the pushing of one pattern plate into the machine causes the pushing out of another plate onto the guides C, C. The conveyance of the pattern plate so pushed out across the guides D, D is effected by means of two sprocket chains I, I running on sprocket wheels I', I' and having between them bars $I^2$, $I^2$. One of these bars $I^2$ and portions of the chains I, I to which it is connected are represented in Figs. 29 and 30 which are respectively a side elevation and a plan. It will be noticed by reference to these figures that the bars $I^2$ are composed of angle iron, except the end portions which are attached to angle pieces upon the chains. The bars $I^2$, $I^2$ are arranged on the chains at such distances apart as to give the necessary interval between the transference of the plates from the guides C, C to the guides E, E. The movement of the plates along the guides E, E is effected by means of a sprocket-chain J carrying projecting pieces J' as shown most clearly in Fig. 31 which is a plan of a portion of such a sprocket chain with one angle piece J' thereon. The transference of the plates from the guides E, E, over the guides F, F, to the guides B, B is effected by means of sprocket chains arranged in a similar manner to the chains I, I. In order to have sufficient length of chain for carrying the bars $I^2, I^2$ at the necessary distance apart, arms K, K carrying adjusting pulleys K', K' are provided on the under side of the frame A, as shown in Figs. 15, 16 and 17. Motion is imparted to the chains as follows, that is to say, the shaft L carrying two of the sprocket wheels supporting the chains I, I of the guides F, F is driven from the shaft of the reversed screw G by means of a pinion L' engaging with an intermediate wheel $L^2$ which drives a wheel $L^3$ upon the shaft L. The motion of this shaft L is communicated through the said chains I, I of the guides F, F to a shaft M having gearing at one end which serve to operate the shaft M' carrying one of the sprocket wheels for driving the chain J of the longitudinal guides E, E. This chain J transmits the motion imparted to it to gearing at N which imparts motion to a shaft N' carrying the sprocket wheels I' upon which the chains I' I of the guides D, D run, the gearing at N being so proportioned that the chains of the guides D, D will run at the same speed as the chains of the guides F, F.

The operation of this apparatus as a whole will be understood from the following description:—Assume one of the pattern plates $g$ to have been just pushed into position beneath the punches and to have pushed out another plate indicated by the cross dotted lines $g'$ on to the guides C, C. Assume also that the other six plates of the series occupy the positions indicated by the cross dotted lines at $g^2, g^3, g^4, g^5, g^6, g^7$. During the time that the punches are operating upon the material upon the plate $g$, the chains of the guides D, D will by means of the bars $I^2$ transfer the plates $g', g^2, g^3$ so far laterally that the plate $g^3$ will be brought on to the guides E, E and at the same time the chains I, I of the guides F, F will transfer the plates $g^5, g^6, g^7$ so far laterally that the plate $g^7$ will be brought onto the guides B, B. Immediately after the punches are raised, and while the press-head remains in its uppermost position during half a revolution of the shaft $j'$ as hereinbefore described, the left hand thread $G^6$ of the drum G operates the slide H to push the plate $g^7$ beneath the plungers and to push the plate $g$ onto the guides C, C; at the same time the chain J is operated to move the plate $g^3$ longitudinally on the guides E, E, the said plate at the same time pushing forward the plate $g^4$ into such a position that it can be taken by one of the cross bars $i^2$ of the chains I, I of the guides F, F. The punches now descend to press out the material upon the plate $g^7$, and at the same time the chains of the guides D, D, operate to transfer the plate $g^2$ onto the guides E, E and the chains I, I of the guides F, F operate to transfer the plate $g^6$ onto the guides B, B and the plate $g^4$ onto the guides F, F. The same operation is repeated as each plate passes under the punches.

It will be observed that the pieces which are grouped to constitute the patterns, and which form the main body of the finished product are cut from sheets of solid material; as distinguished from painting the pattern as heretofore in making oil cloths.

Having now particularly described and ascertained the nature of the said invention and in what manner the same is to be performed, I declare that what I claim is—

1. In a machine for the manufacture of floor cloth, a series of cutting punches corresponding in shape to the different parts of the pattern of linoleum or like material to be produced, a frame in which said punches are held, each of said punches being guided by the adjacent punches, and mechanism for operating the punches whereby the pattern pieces cut from the said material are deposited upon the canvas backing, substantially as and for the purposes described.

2. The series of punches or dies provided severally with pins $e^2$ having heads $e^4$, combined with a movable frame having guide plates $e^3$, $e^5$, therein in which said pins can slide, substantially as described.

3. In a machine provided with a series of punches or dies supported or suspended as hereinbefore described, a press-head of polygonal shape having applied to each of its faces, pins adapted to operate in connection with the headed pins of the said punches or dies for cutting pieces of material of one color, substantially as described.

4. The series of punches or dies operating to cut through the linoleum or like fabric of which the pattern is to be formed, combined with a series of pattern plates, and mechanism substantially as described for introducing and removing said plates successively into the machine.

5. In combination, the pusher or slide H, plate H', traveler $H^2$, lever $H^3$, bar $H^4$, cam $H^5$, tappet $H^6$, and drum G, having a cam-surface $H^7$, substantially as and for the purposes set forth.

WILLIAM JOHN BEARD.

Witnesses:
G. J. REDFERN,
JOHN E. BOUSFIELD,
*Of the firm of G. F. Redfern & Co., 4 South Street, Finsbury, London, Patent Agents.*